(12) United States Patent
Ivans et al.

(10) Patent No.: US 11,691,725 B2
(45) Date of Patent: Jul. 4, 2023

(54) TWIN FUSELAGE TILTROTOR AIRCRAFT

(71) Applicant: Bell Textron Inc., Fort Worth, TX (US)

(72) Inventors: Steven R. Ivans, Ponder, TX (US); Robert Roe, Fort Worth, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 0 days.

(21) Appl. No.: 17/528,989

(22) Filed: Nov. 17, 2021

(65) Prior Publication Data
US 2023/0150659 A1 May 18, 2023

(51) Int. Cl.
*B64C 29/00* (2006.01)
*B64C 39/04* (2006.01)

(52) U.S. Cl.
CPC .......... *B64C 29/0033* (2013.01); *B64C 39/04* (2013.01)

(58) Field of Classification Search
CPC .............................. B64C 29/0033; B64C 39/04
See application file for complete search history.

(56) References Cited

U.S. PATENT DOCUMENTS

| | | | |
|---|---|---|---|
| 3,159,361 A * | 12/1964 | Weiland | B60V 1/14 180/117 |
| 5,071,088 A * | 12/1991 | Betts | B64C 29/0066 244/45 R |
| 6,592,073 B1 * | 7/2003 | Meekins | B64C 25/34 244/105 |
| 8,857,755 B2 | 10/2014 | Karim | |
| 2012/0318908 A1 | 12/2012 | Morris | |
| 2014/0124613 A1 | 5/2014 | Yang | |
| 2014/0158815 A1 * | 6/2014 | Renteria | B64C 39/04 244/12.1 |
| 2014/0263831 A1 * | 9/2014 | Mitchell, Jr. | B64D 11/00 244/1 N |
| 2020/0140079 A1 * | 5/2020 | Campbell | B64C 39/024 |
| 2020/0239134 A1 * | 7/2020 | Robertson | B64C 11/001 |
| 2021/0253234 A1 * | 8/2021 | Tao | B64C 29/0025 |
| 2021/0347472 A1 * | 11/2021 | Karem | B64C 39/08 |

FOREIGN PATENT DOCUMENTS

EP 2769910 A3 1/2018

OTHER PUBLICATIONS

Team Lead Michael Creaven, "NASA Tiltrotor Design Report," May 2010, 34 pages; http://www.dept.aoe.vt.edu/~mason/Mason_f/VTRAFT_final_report.pdf.

* cited by examiner

*Primary Examiner* — Tien Q Dinh
*Assistant Examiner* — William L Gmoser
(74) *Attorney, Agent, or Firm* — Akona IP (57) ABSTRACT

One embodiment is an aircraft including first and second fuselages; a wing assembly connecting the first and second fuselages, wherein the first and second fuselages are parallel to one another; first and second forward propulsion systems tiltably attached to forward ends of the first and second fuselages; and first and second aft propulsion systems fixedly attached proximate aft ends of the first and second fuselages.

20 Claims, 8 Drawing Sheets

TWIN FUSELAGE TILTROTOR AIRCRAFT

TECHNICAL FIELD

This disclosure relates in general to the field of tiltrotor aircraft and, more particularly, though not exclusively, to twin fuselage arrangements for such aircraft.

BACKGROUND

An electric vertical takeoff and landing (eVTOL) aircraft is a type of aircraft that uses electric power to supply rotational energy through electric motor(s) to props, rotors, or fans in an aircraft propulsion system for enabling the aircraft to hover, take off, and land vertically. Because of their versatility and lack of a need for a runway, eVTOL aircraft are particularly useful for providing urban air mobility. As used herein, the term eVTOL also includes VTOL aircraft that use hybrid-electric (with an engine running a generator producing electricity and battery stored power) or turbo electric (an engine running a generator providing all power required) propulsion systems. One particular type of eVTOL aircraft is an electric tiltrotor aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage(s) of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage(s) of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Described herein are various configurations for twin fuselage tiltrotor aircraft. In particular, both hexrotor and quadrotor configurations are disclosed. Embodiments of tiltrotor aircraft described herein may be suitable for use in a variety of unmanned aircraft applications, including but not limited to unmanned logistics operations, joint surveillance and target attack radar system (JSTAR) applications, and military and other unmanned aerial systems (UAS) applications, to name a few. Embodiments described herein distribute propulsion around the aircraft to achieve large center of gravity (CG) envelopes and employ a long wing to facilitate efficient cruise operation. Twin fuselages may be used for packaging aircraft components and/or to support landing gear, which may include but is not limited to skids, fixed wheels, and retractable wheels, to name a few. Modular payload, such as a cargo pod, a weapons assembly and/or one or more sensors, may be mounted to the underside of a center wing section between the fuselages. In certain embodiments, twin fuselages may be implemented as twin booms. A distinguishing feature of embodiments described herein is the lack of a center boom/fuselage between the twin (outboard) fuselages.

Figure 1A:
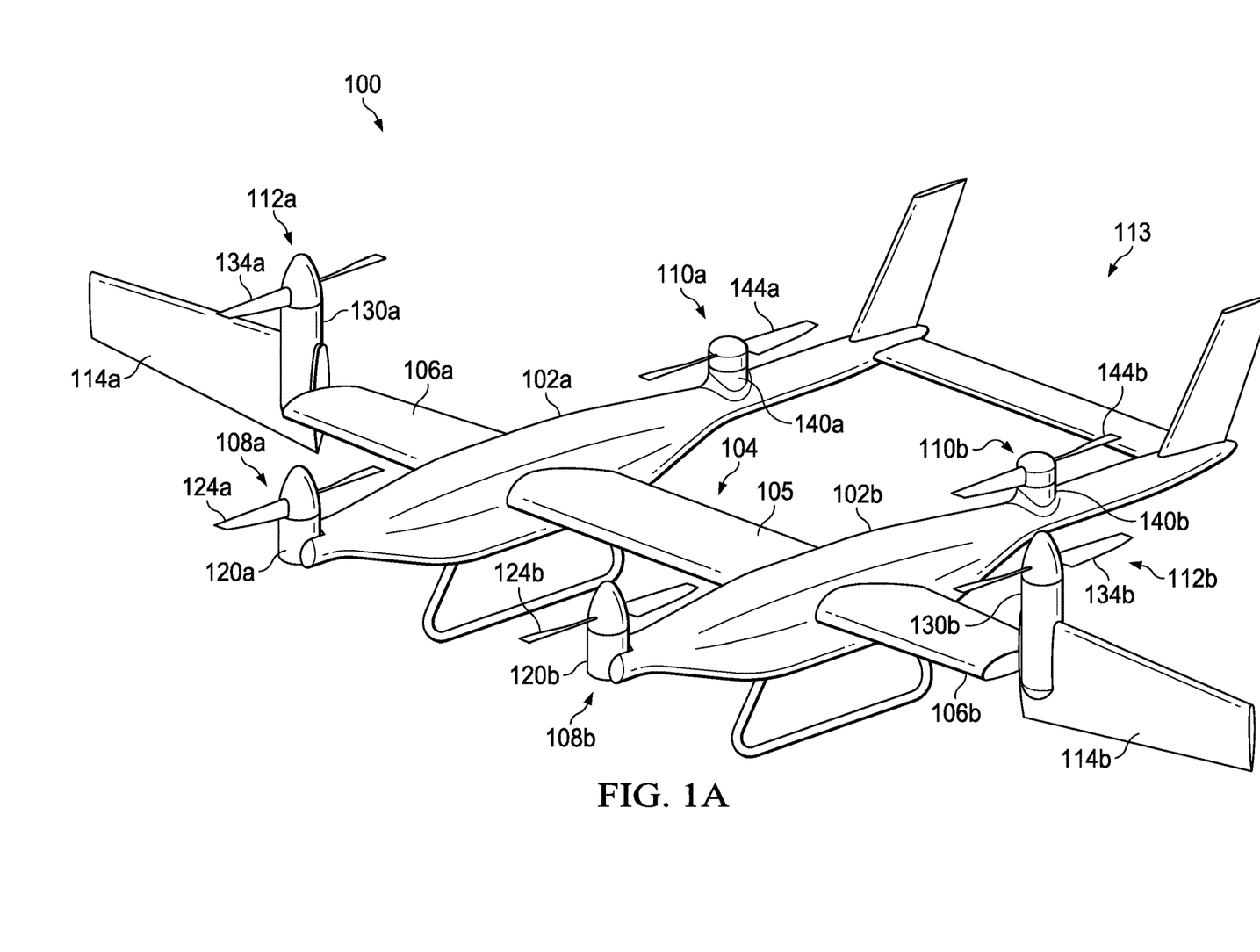
FIGS. 1A-1B illustrate a tiltrotor aircraft having a twin fuselage hexrotor configuration in accordance with embodiments described herein.
Figure 1B:
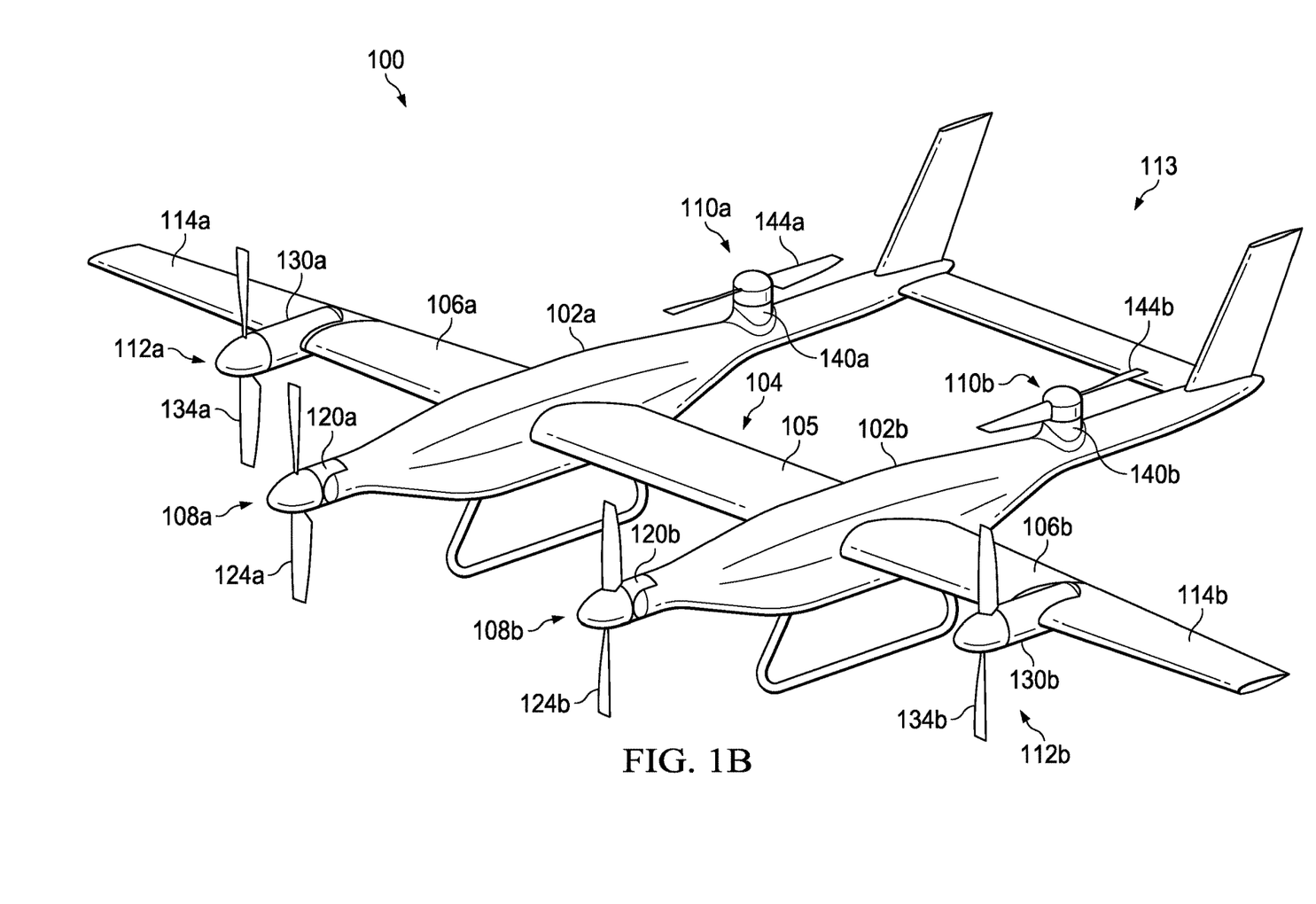

FIGS. 1A and 1B illustrate an example tiltrotor aircraft 100 that is convertible between a VTOL or hover (also commonly referred to as helicopter) mode (shown in FIG. 1A), which allows for vertical takeoff and landing, hovering, and low speed directional movement, and a cruise (also commonly referred to as airplane) mode (shown in FIG. 1B), which allows for forward flight. Aircraft 100 includes two fuselages 102a, 102b, and a wing assembly 104 including a center wing section 105 extending between and interconnecting fuselages 102a, 102b, and outboard wing portions 106a, 106b, extending outboard of fuselages 102a, 102b. In accordance with features of embodiments described herein, aircraft 100 further includes three pairs of propulsion systems, including forward propulsion systems 108a, 108b, connected to the forward ends of the fuselages 102a, 102b, aft propulsion systems 110a, 110b, connected proximate the aft ends of the fuselages 102a, 102b, and a pair of wing-mounted propulsion systems 112a, 112b, proximate opposite ends of wing assembly 104. In particular, in accordance with features of embodiments described herein, and as illustrated in FIGS. 1A and 1B, wing-mounted propulsion systems 112a, 112b, are connected to inboard ends of wing tips 114a, 114b, disposed on outboard ends of outboard wing portions 106a, 106b. As shown in FIGS. 1A and 1B, aircraft 100 further includes a tail assembly 113 connected to aft ends of fuselages 102a, 102b. Although as shown in FIGS. 1A and 1B, tail assembly 113 is illustrated as including a pair of boom-mounted stabilizers, other tail assembly configurations may be implemented without departing from the spirit or scope of embodiments described herein.

In the illustrated embodiment, each forward propulsion system 108a, 108b, includes a drive system housing comprising a pylon 120a, 120b, and a rotatable open rotor assembly comprising a plurality of rotor blades 124a, 124b, connected to a rotor shaft and configured to rotate about a rotor axis. As shown in FIGS. 1A and 1B, the rotor assemblies of forward propulsion systems 108a, 108b, include two (2) rotor blades; however, it should be recognized that more blades may be implemented without departing from the spirit and the scope of the embodiments described. Rotation of rotor blades 124a, 124b, generates lift while operating in helicopter mode and thrust while operating in airplane mode. Each pylon 120a, 120b, may house one or more electric motors therein configured to produce rotational energy that drives the rotation of the rotor assembly. Alternatively, each pylon 120a, 120b, may house a gearbox therein that drives the rotation of the rotor assembly, wherein the gearbox receives rotational energy from a driveshaft.

In the illustrated embodiment, each wing-mounted propulsion system 112a, 112b, includes a drive system housing comprising a pylon 130a, 130b, and a rotatable open rotor assembly comprising a plurality of rotor blades 134a, 134b, connected to a rotor shaft and configured to rotate about a rotor axis. As shown in FIGS. 1A and 1B, the rotor assemblies of propulsion systems 112a, 112b, include two (2) rotor blades; however, it should be recognized that more blades may be implemented without departing from the spirit and the scope of the embodiments described. It should also be recognized that rotor assemblies of propulsion systems 112a, 112b, may include a different number of rotor blades than rotor assemblies of propulsion systems 108a, 108b. Rotation of rotor blades 134a, 134b, generates lift while operating in helicopter mode and thrust while operating in airplane mode. Each pylon 130a, 130b, may house one or more electric motors therein configured to produce rotational energy that drives the rotation of the rotor assembly. Alternatively, each pylon 130a, 130b, may house a gearbox therein that drives the rotation of the rotor assembly, wherein the gearbox receives rotational energy from a driveshaft.

In the illustrated embodiment, each aft propulsion system 110a, 110b, includes a drive system housing comprising a pylon 140a, 140b, and a rotatable open rotor assembly comprising a plurality of rotor blades 144a, 144b, connected to a rotor shaft and configured to rotate about a rotor axis. As shown in FIGS. 1A and 1B, the rotor assemblies of propulsion systems 110a, 110b, include two (2) rotor blades; however, it should be recognized that more blades may be implemented without departing from the spirit and the scope of the embodiments described. It should also be recognized that rotor assemblies of propulsion systems 110a, 110b, may include a different number of rotor blades than rotor assemblies of propulsion systems 108a, 108b, 112a, 112b.

Rotation of rotor blades 144a, 144b generates lift while operating in helicopter mode. Each pylon 140a, 140b, may house one or more electric motors therein configured to produce rotational energy that drives the rotation of the rotor assembly. Alternatively, each pylon 140a, 140b, may house a gearbox therein that drives the rotation of the rotor assembly, wherein the gearbox receives rotational energy from a driveshaft.

In accordance with features of embodiments described herein, and as illustrated in FIGS. 1A and 1B, wing-mounted propulsion systems 112a, 112b, are connected to inboard ends of wing tips 114a, 114b, attached to outboard ends of wing assembly 104. Wing tips 114a, 114b, together with wing-mounted propulsion systems 112a, 112b, tilt relative to wing assembly 104 between a first position (FIG. 1A), in which propulsion systems 112a, 112b, and wing tips 114a, 114b, are configured in a hover mode, and a second position (FIG. 1B), in which propulsion systems 112a, 112b, and wing tips 114a, 114b, are configured in a cruise mode. It will be recognized that wing tips 114a, 114b, are not necessary and that in alternative embodiments, wing tips are omitted.

In accordance with features of embodiments described herein, forward propulsion systems 108a, 108b, (and more specifically, pylons 120a, 120b) are tiltably connected to forward ends of fuselages 102a, 102b, such that they may be tilted between a first position (FIG. 1A), in which propulsion systems 108a, 108b, are configured in a hover mode, and a second position (FIG. 1B), in which propulsion systems 108a, 108b, are configured in a cruise mode.

In accordance with features of embodiments described herein, aft propulsion systems 110a, 110b, are fixedly attached to fuselages 102a, 102b, proximate aft ends thereof (forward of tail assembly 113) and do not convert between hover mode (FIG. 1A) and cruise mode (FIG. 1B).

The position of the rotor assemblies of the forward propulsion systems 108a, 108b, and wing-mounted propulsion systems 112a, 112b, as well as the pitch of individual rotor blades 124a, 124b, 134a, 134b, 144a, 144b, can be selectively controlled in order to selectively control direction, thrust, and lift of aircraft 100. As previously noted, propulsion systems 108a, 108b, 112a, 112b, are each convertible, relative to fuselages 102a, 102b, between a vertical position, as shown in FIG. 1A, and a horizontal position, as shown in FIG. 1B. Propulsion systems 108a, 108b, 112a, 112b, are in the vertical position during vertical takeoff and landing mode. Vertical takeoff and landing mode may be considered to include hover operations of aircraft 100. Propulsion systems 108a, 108b, 112a, 112b, are in the horizontal position during forward flight mode, in which aircraft 100 is in forward flight. In forward flight mode, propulsion systems 108a, 108b, 112a, 112b, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 108a, 108b, 112a, 112b, may be tiltable between the vertical and horizontal positions by actuators (not shown) that are tiltable in response to commands originating from a pilot and/or a flight control system. Each of the propulsion systems 108a, 108b, 110a, 110b, 112a, 112b, may utilize an electric motor and gearbox unit disposed within a respective pylon 120a, 120b, 130a, 130b, 140a, 140b or a direct drive motor of group of motors on the same shaft as a power source to rotate the respective rotor assembly about the rotor axis via the rotor shaft.

It should be noted that, although propulsion systems 108a, 108b, are shown and described as being tiltable between cruise and hover positions, those propulsion systems may be fixed in the hover positions, similarly to propulsion systems 110a, 110b. Additionally and/or alternatively, propulsion systems 112a, 112b, may be connected to opposite ends of the wing assembly 104 such that only pylons 130a, 130b, or a portion thereof, are tiltable relative to the wing assembly 104. The tiltable pylons 120a, 120b and 130a and 130b may also be differentially tiltable and may vary in power to control yaw of the aircraft whereas different thrust for roll and pitch is controlled through differential blade pitch, rpm, and motor power.

In accordance with features of embodiments described herein, when aircraft 100 is in cruise mode, the rotor assemblies of aft propulsion systems 110a, 110b, may cease rotation. In embodiments in which forward propulsion systems 108a, 108b, are also fixed (i.e., do not convert between hover and cruise modes), rotor assemblies of propulsion systems 108a, 108b, may also cease rotation when aircraft 100 is in cruise mode. Fewer active rotor assemblies in cruise mode improves blade loading and propulsive efficiency of the props. In addition, stopping or slowing the aft rotors reduces drag. The lift is accomplished with the wings so lift from rotors 110a, 110b, is not necessary. With six rotor assemblies, a rotor assembly can be lost while still allowing aircraft 100 to hover even without motor redundancy per rotor assembly. In the event of a rotor failure, the rotor on the opposite side of the aircraft would be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 100 to stay weight efficient without requiring extensive cross-connects.

Figure 1C:
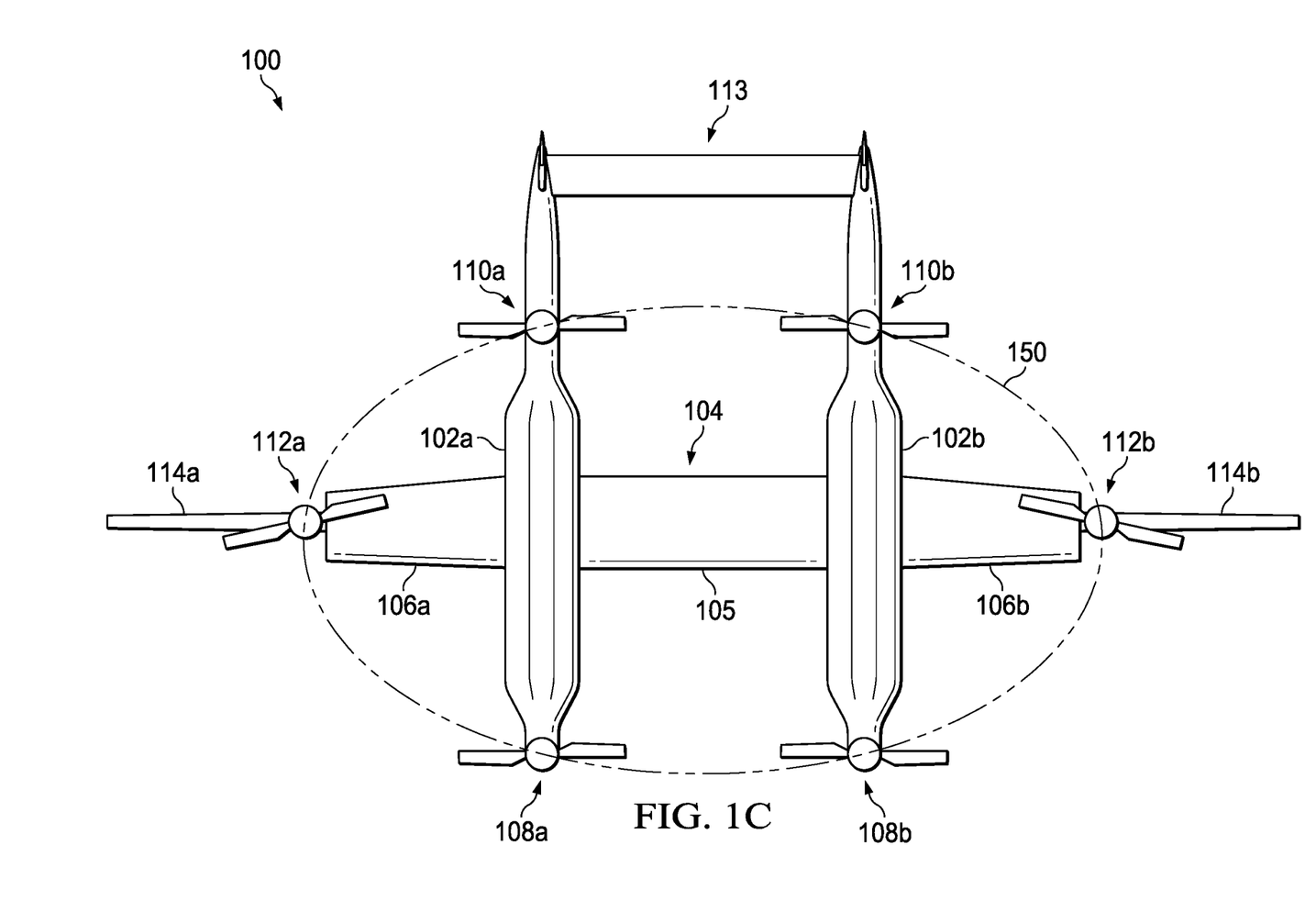
FIG. 1C illustrates a hexrotor arc arrangement of rotors of the tiltrotor aircraft of FIGS. 1A and 1B.

Because the aircraft 100 includes six (6) rotor assemblies, the aircraft may be referred to as a "hexrotor aircraft." FIG. 1C illustrates a hexrotor arc arrangement 150 when aircraft 100 is in hover mode. In particular, to allow the minimum number of rotors and still allow loss of a rotor as a recoverable failure mechanism in a hover, the rotors are arranged in an arc arrangement both side-to-side and forward-to-aft. As a result, when one rotor is lost and a second rotor is powered down, the aircraft can still be balanced as a quad arrangement on the remaining rotors. If a linear arrangement were used, the power and balance requirements would prevent recovery on just four rotors. Multi-copters with more than six rotors may recover by offsetting opposing rotors, but six in the illustrated arc arrangement is the minimum to allow a recovery after failure and result in significant weight savings due to fewer redundant motors and rotors.

Figure 2A:
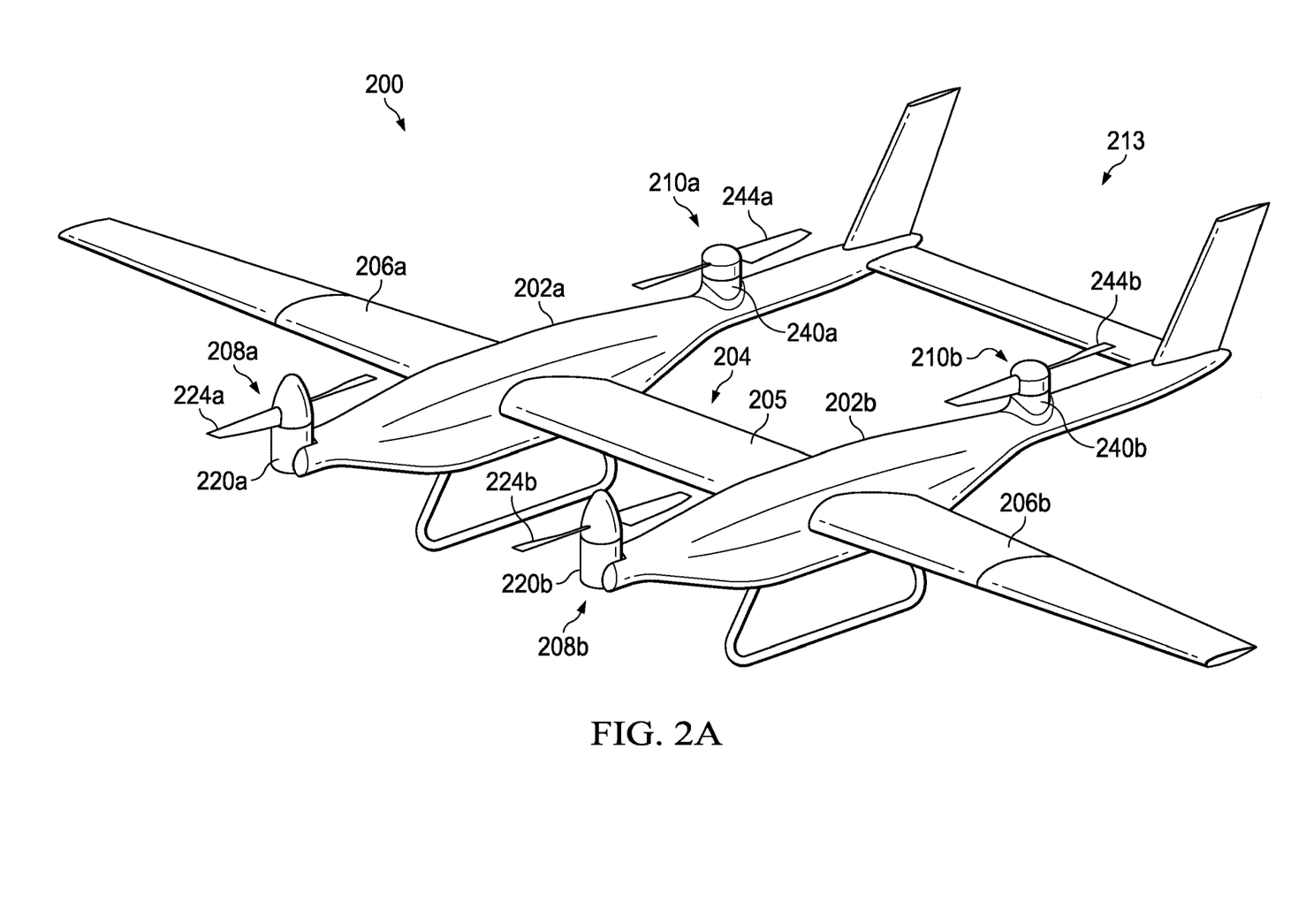
FIGS. 2A-2B illustrate a tiltrotor aircraft having a twin fuselage quadrotor configuration in accordance with embodiments described herein.
Figure 2B:
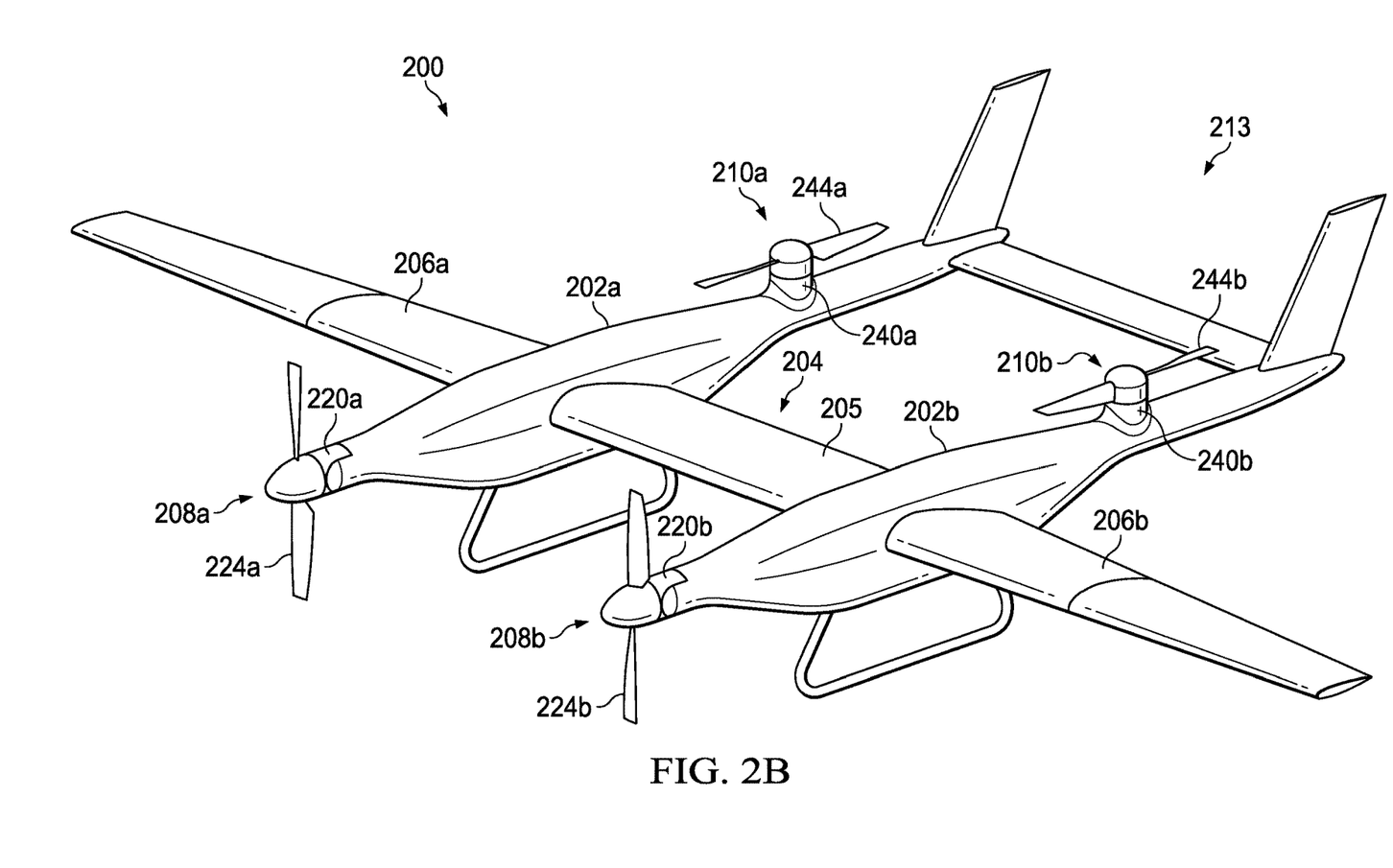

FIGS. 2A and 2B illustrate an example tiltrotor aircraft 200 that is convertible between a VTOL or hover (also commonly referred to as helicopter) mode (shown in FIG. 2A), which allows for vertical takeoff and landing, hovering, and low speed directional movement, and a cruise (also commonly referred to as airplane) mode (shown in FIG. 2B), which allows for forward flight. Aircraft 200 includes two fuselages 202a, 202b, and a wing assembly 204 including a center wing section 205 extending between and interconnecting fuselages 202a, 202b, and outboard wing portions 206a, 206b, extending outboard of fuselages 202a, 202b. In accordance with features of embodiments described herein, aircraft 200 further includes two pairs of propulsion systems, including forward propulsion systems 208a, 208b, connected to the forward ends of the fuselages 202a, 202b, and aft propulsion systems 210a, 210b, connected proximate the aft ends of the fuselages 202a, 202b. As shown in FIGS. 2A and 2B, aircraft 200 further includes a tail assembly 213 connected to aft ends of fuselages 202a, 202b. Although as shown in FIGS. 2A and 2B, tail assembly 213 is illustrated as including a pair of boom-mounted stabilizers, other tail assembly configurations may be implemented without departing from the spirit or scope of embodiments described herein.

In the illustrated embodiment, each forward propulsion system 208a, 208b, includes a drive system housing comprising a pylon 220a, 220b, and a rotatable open rotor assembly comprising a plurality of rotor blades 224a, 224b, connected to a rotor shaft and configured to rotate about a rotor axis. As shown in FIGS. 2A and 2B, the rotor assemblies of forward propulsion systems 208a, 208b, include two (2) rotor blades; however, it should be recognized that more blades may be implemented without departing from the spirit and the scope of the embodiments described. Rotation of rotor blades 224a, 224b, generates lift while operating in helicopter mode and thrust while operating in airplane mode. Each pylon 220a, 220b, may house one or more electric motors therein configured to produce rotational energy that drives the rotation of the rotor assembly. Alternatively, each pylon 220a, 220b, may house a gearbox therein that drives the rotation of the rotor assembly, wherein the gearbox receives rotational energy from a driveshaft.

In the illustrated embodiment, each aft propulsion system 210a, 210b, includes a drive system housing comprising a pylon 240a, 240b, and a rotatable open rotor assembly comprising a plurality of rotor blades 244a, 244b, connected to a rotor shaft and configured to rotate about a rotor axis. As shown in FIGS. 2A and 2B, the rotor assemblies of propulsion systems 210a, 210b, include two (2) rotor blades; however, it should be recognized that more blades may be implemented without departing from the spirit and the scope of the embodiments described. It should also be recognized that rotor assemblies of propulsion systems 210a, 210b, may include a different number of rotor blades than rotor assemblies of propulsion systems 208a, 208b.

Rotation of rotor blades 244a, 244b generates lift while operating in helicopter mode. Each pylon 240a, 240b, may house one or more electric motors therein configured to produce rotational energy that drives the rotation of the rotor assembly. Alternatively, each pylon 240a, 240b, may house a gearbox therein that drives the rotation of the rotor assembly, wherein the gearbox receives rotational energy from a driveshaft.

In accordance with features of embodiments described herein, forward propulsion systems 208a, 208b, (and more specifically, pylons 220a, 220b) are tiltably connected to forward ends of fuselages 202a, 202b, such that they may be tilted between a first position (FIG. 2A), in which propulsion systems 208a, 208b, are configured in a hover mode, and a second position (FIG. 2B), in which propulsion systems 208a, 208b, are configured in a cruise mode. In accordance with features of embodiments described herein, aft propulsion systems 210a, 210b, are fixedly attached to fuselages 202a, 202b, proximate aft ends thereof (forward of tail assembly 213) and do not convert between hover mode (FIG. 2A) and cruise mode (FIG. 2B).

The position of the rotor assemblies of the forward propulsion systems 208a, 208b, as well as the pitch of individual rotor blades 224a, 224b, 244a, 244b, can be selectively controlled in order to selectively control direction, thrust, and lift of aircraft 200. As previously noted, propulsion systems 208a, 208b, are each convertible, relative to fuselages 202a, 202b, between a vertical position, as shown in FIG. 2A, and a horizontal position, as shown in FIG. 2B. Propulsion systems 208a, 208b, are in the vertical position during vertical takeoff and landing mode. Vertical takeoff and landing mode may be considered to include hover operations of aircraft 200. Propulsion systems 208a, 208b, are in the horizontal position during forward flight mode, in which aircraft 200 is in forward flight. In forward flight mode, propulsion systems 208a, 208b, direct their respective thrusts in the aft direction to propel aircraft 200 forward. Aircraft 200 is operable to fly in all directions during the vertical takeoff and landing mode configuration of FIG. 2A, although faster forward flight is achievable while in the forward flight mode configuration of FIG. 2B. Propulsion systems 208a, 208b, may be tiltable between the vertical and horizontal positions by actuators (not shown) that are tiltable in response to commands originating from a pilot and/or a flight control system. Each of the propulsion systems 208a, 208b, 210a, 210b, may utilize an electric motor and gearbox unit disposed within a respective pylon 220a, 220b, 240a, 240b or a direct drive motor of group of motors on the same shaft as a power source to rotate the respective rotor assembly about the rotor axis via the rotor shaft.

The tiltable pylons 220a, 220b, may be differentially tiltable and may vary in power to control yaw of the aircraft whereas different thrust for roll and pitch is controlled through differential blade pitch, rpm, and motor power.

In accordance with features of embodiments described herein, when aircraft 200 is in cruise mode, the rotor assemblies of aft propulsion systems 210a, 210b, may cease rotation or rotate slower. Fewer active rotor assemblies in cruise mode improves blade loading and propulsive efficiency of the props. In addition, stopping or slowing the aft rotors reduces drag. The lift is accomplished with the wings so lift from rotors 210a, 210b is not necessary.

Because the aircraft 200 includes four (4) rotor assemblies, the aircraft may be referred to as a "quadrotor aircraft."

Figure 3A:
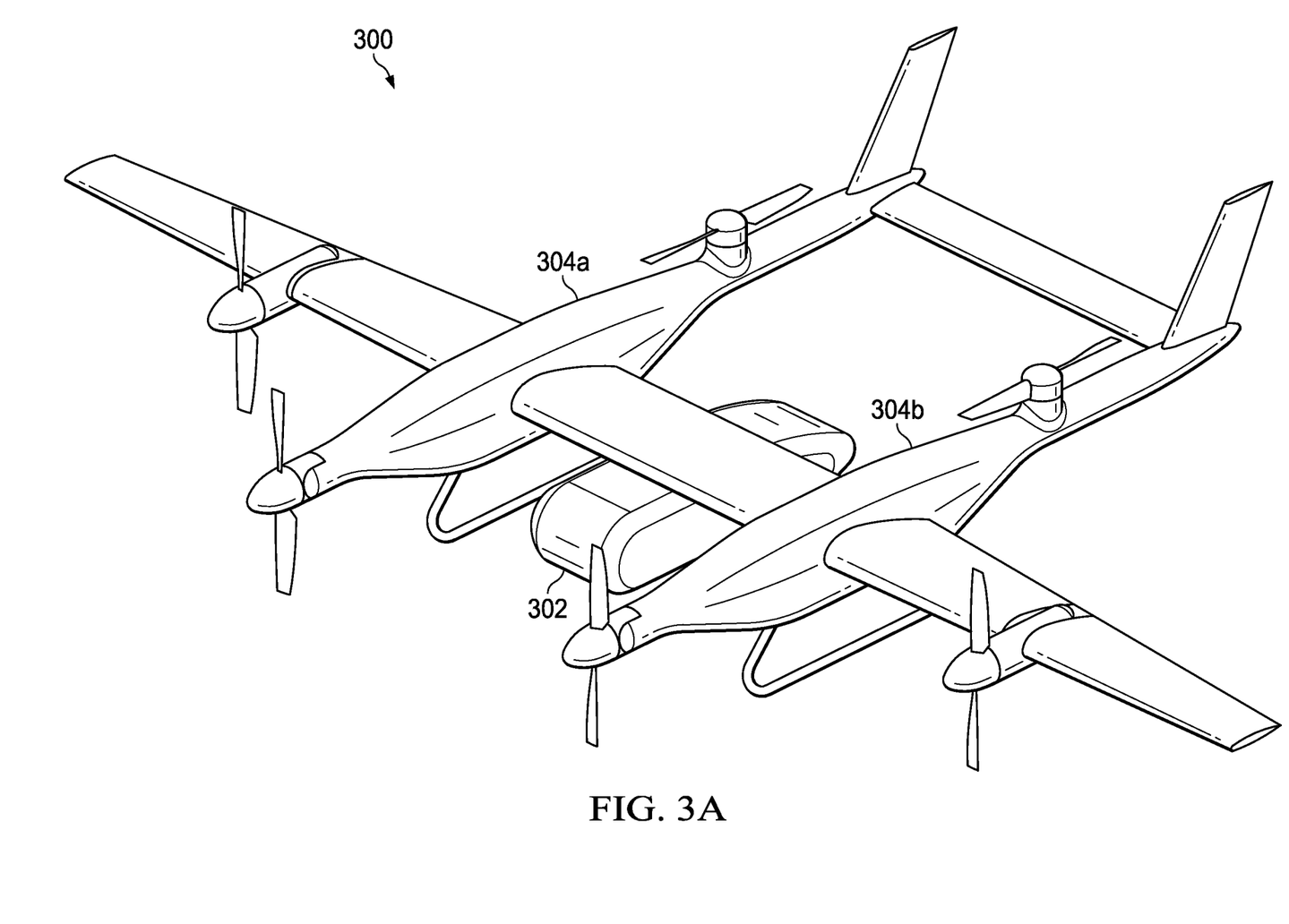
FIGS. 3A-3B illustrate a tiltrotor aircraft having a twin fuselage hexrotor configuration including a cargo pod between the fuselages in accordance with embodiments described herein.
Figure 3B:
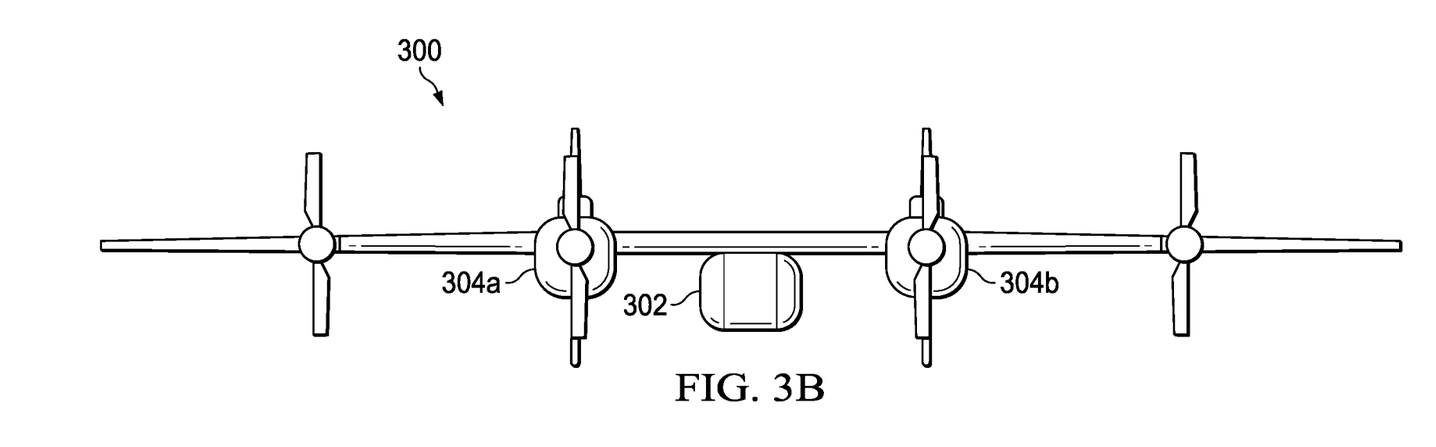

FIGS. 3A-3B illustrate an example tiltrotor aircraft 300 that is convertible between a VTOL or hover (also commonly referred to as helicopter) mode (shown in FIG. 3A), which allows for vertical takeoff and landing, hovering, and low speed directional movement, and a cruise (also commonly referred to as airplane) mode (shown in FIG. 3B), which allows for forward flight. The aircraft 300 is substantially identical to the aircraft 100 (FIGS. 1A-1B) except that the aircraft 300 includes a cargo pod 302 connected to the underside of wing assembly between twin fuselages 304a, 304b.

Figure 4A:
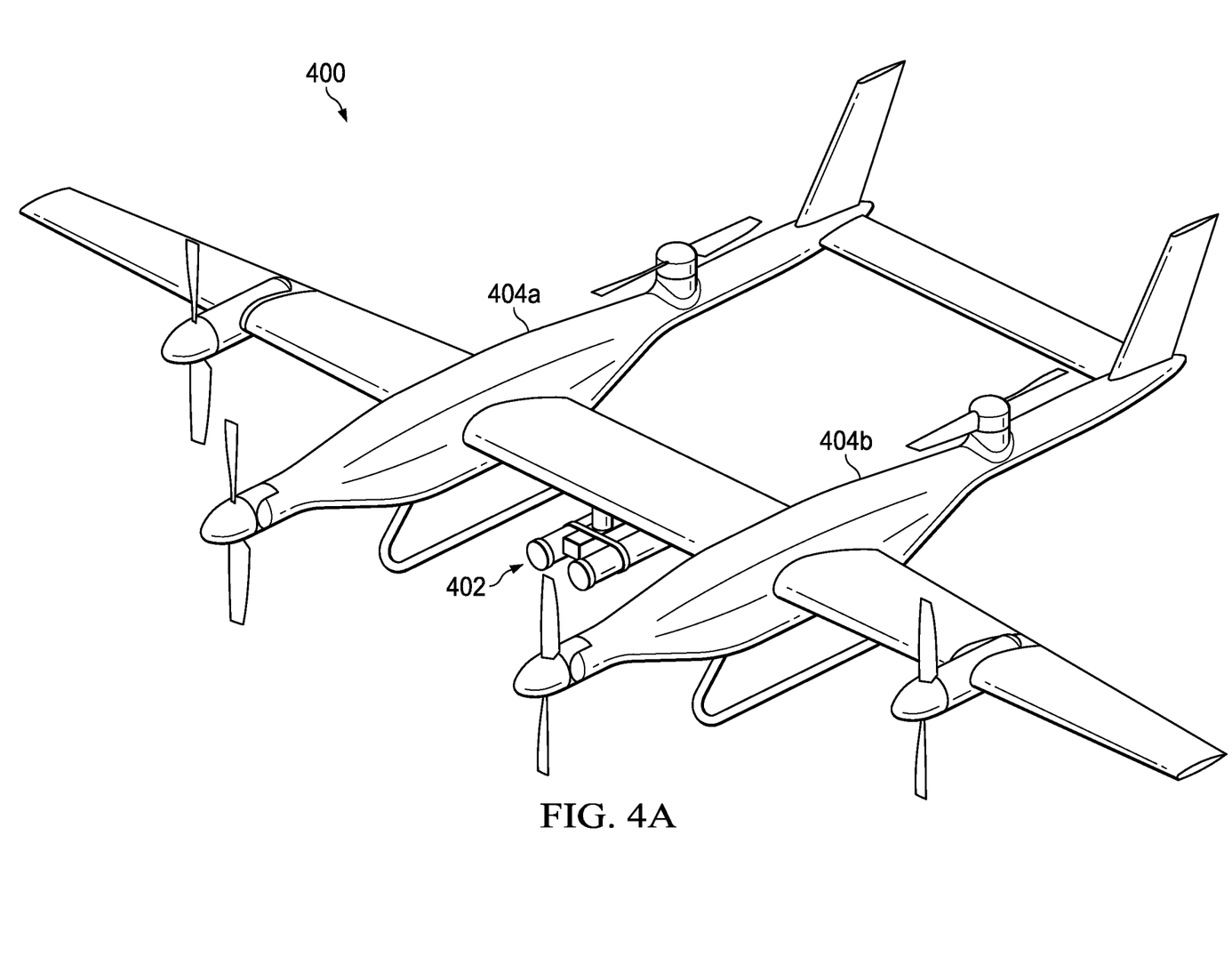
FIGS. 4A-4B illustrate a tiltrotor aircraft having a twin fuselage hexrotor configuration including a weapons assembly between the fuselages in accordance with embodiments described herein.
Figure 4B:
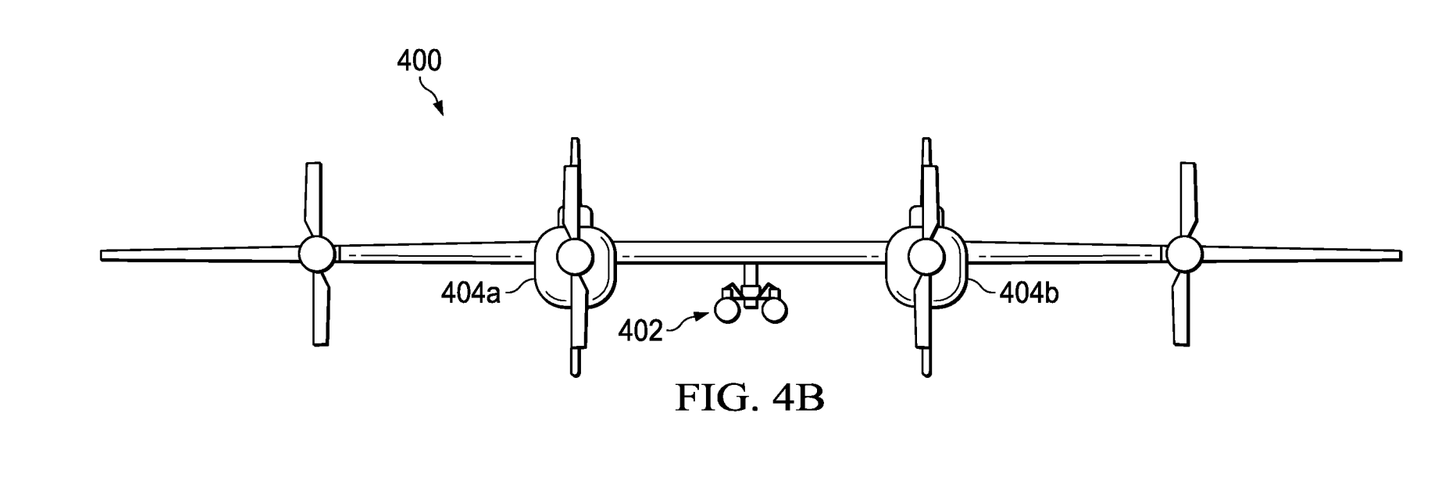

FIGS. 4A-4B illustrate an example tiltrotor aircraft 400 that is convertible between a VTOL or hover (also commonly referred to as helicopter) mode (shown in FIG. 4A), which allows for vertical takeoff and landing, hovering, and low speed directional movement, and a cruise (also commonly referred to as airplane) mode (shown in FIG. 4B), which allows for forward flight. The aircraft 400 is substantially identical to the aircraft 100 (FIGS. 1A-1B) except that the aircraft 400 includes a weapons assembly 402 disposed between twin fuselages 404a, 404b. It will be recognized that other types of external cargo, such as sensors, may be supported between the fuselages as shown in FIGS. 3A, 3B, 4A, and 4B.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor shafts and other components may comprise steel, aluminum, or titanium.

Example 1 provides an aircraft comprising first and second fuselages; a wing assembly connecting the first and second fuselages, wherein the first and second fuselages are parallel to one another; first and second forward propulsion systems tiltably attached to forward ends of the first and second fuselages; and first and second aft propulsion systems fixedly attached proximate aft ends of the first and second fuselages.

Example 2 provides the aircraft of example 1, further comprising a tail assembly attached to the aft ends of the first and second fuselages.

Example 3 provides the aircraft of any of examples 1-2, further comprising first and second wing-mounted propulsion systems tiltably connected to outboard ends of the wing assembly.

Example 4 provides the aircraft of example 3, further comprising first and second wing tips fixedly connected to outboard sides of the first and second wing-mounted propulsion systems.

Example 5 provides the aircraft of example 4, wherein the first and second wing-mounted propulsion systems and the first and second wing tips are collectively tiltable between a first position when the aircraft is in a hover mode and a second position when the aircraft is in a cruise mode.

Example 6 provides the aircraft of any of examples 1-5, wherein each of the propulsion systems includes a rotor assembly comprising a plurality of rotor blades.

Example 7 provides the aircraft of example 6, wherein the rotor assemblies of the first and second aft propulsion systems rotate when the aircraft is in the hover mode and cease to rotate when the aircraft is in the cruise mode.

Example 8 provides the aircraft of any of examples 1-7, wherein the first and second forward propulsion systems are tiltably connected to the forward ends of the first and second fuselages such that the first and second forward propulsion systems are tiltable between a first position when the aircraft is in the hover mode and a second position when the aircraft is in the cruise mode.

Example 9 provides the aircraft of any of examples 1-8, wherein the propulsion systems collectively comprise a hexrotor arc when the aircraft is in the hover mode.

Example 10 provides the aircraft of any of examples 1-9, further comprising a cargo pod between the first and second fuselages.

Example 11 provides the aircraft of example 10, wherein the cargo pod is connected to an underside of the wing assembly.

Example 12 provides the aircraft of any of examples 1-11, further comprising external payload between the first and second fuselages.

Example 13 provides the aircraft of example 12, wherein the external payload is connected to an underside of the wing assembly.

Example 14 provides the aircraft of example 12, wherein the external payload comprises at least one of a weapons assembly and a sensor.

Example 15 provides an eVTOL selectively convertible between a hover mode and a cruise mode, the eVTOL comprising a first fuselage; a second fuselage parallel to the first fuselage; a wing assembly connecting the first and second fuselages; first and second forward propulsion systems attached to forward ends of the first and second fuselages, the first and second forward propulsion systems comprising first and second pylons tiltable relative to the first and second fuselages between a first position when the aircraft is in a hover mode and a second position when the aircraft is in a cruise mode, wherein each of the pylons houses a drive system for providing rotational power to rotor assemblies of the forward propulsion systems; and first and second aft propulsion systems fixedly attached proximate aft ends of the first and second fuselages.

Example 16 provides the eVTOL of example 15, further comprising first and second wing-mounted propulsion systems tiltably connected to outboard ends of the wing assembly.

Example 17 provides the eVTOL of example 16, further comprising first and second wing tips fixedly connected to outboard sides of the first and second wing-mounted propulsion systems.

Example 18 provides the eVTOL of example 17, wherein the first and second wing-mounted propulsion systems and the first and second wing tips are collectively tiltable between a first position when the aircraft is in a hover mode and a second position when the aircraft is in a cruise mode.

Example 19 provides the eVTOL of any of examples 16-18, wherein each of the propulsion systems includes a rotor assembly comprising a plurality of rotor blades.

Example 20 provides the eVTOL of example 19, wherein the rotor assemblies of the first and second aft propulsion systems rotate when the aircraft is in the hover mode and cease to rotate when the aircraft is in the cruise mode.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: $R=RI+k * (Ru-RI)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An aircraft comprising:
first and second fuselages;
a wing assembly connecting the first and second fuselages, wherein the first and second fuselages are parallel to one another;
first and second forward propulsion systems tiltably attached to forward ends of the first and second fuselages such that the first and second propulsion systems are tiltable between a first orientation in which rotor blades of the first and second forward propulsion systems are disposed above the first and second fuselages and a second orientation in which the rotor blades of the first and second forward propulsion systems are disposed forward of forward ends of the first and second fuselages; and
first and second aft propulsion systems fixedly attached to the first and second fuselages proximate aft ends thereof such that rotor blades of the first and second aft propulsion systems are rotatable in a plane substantially parallel with longitudinal axes of the first and second fuselages, wherein the first and second aft propulsion systems comprise pylons attached directly to upper surfaces of the first and second fuselages.

2. The aircraft of claim 1, further comprising a tail assembly attached to the aft ends of the first and second fuselages.

3. The aircraft of claim 1, further comprising first and second wing-mounted propulsion systems tiltably connected to outboard ends of the wing assembly.

4. The aircraft of claim 3, further comprising first and second wing tips fixedly connected to outboard sides of the first and second wing-mounted propulsion systems.

5. The aircraft of claim 4, wherein the first and second wing-mounted propulsion systems and the first and second wing tips are collectively tiltable between a first position when the aircraft is in a hover mode and a second position when the aircraft is in a cruise mode.

6. The aircraft of claim 1, wherein each of the propulsion systems includes a rotor assembly comprising a plurality of rotor blades.

7. The aircraft of claim 6, wherein the rotor assemblies of the first and second aft propulsion systems rotate when the aircraft is in the hover mode and cease to rotate when the aircraft is in the cruise mode.

8. The aircraft of claim 1, wherein the first and second forward propulsion systems are tiltably connected to the forward ends of the first and second fuselages such that the first and second forward propulsion systems are tiltable between a first position when the aircraft is in the hover mode and a second position when the aircraft is in the cruise mode.

9. The aircraft of claim 1, wherein the propulsion systems collectively comprise a hexrotor arc when the aircraft is in the hover mode.

10. The aircraft of claim 1, further comprising a cargo pod between the first and second fuselages.

11. The aircraft of claim 10, wherein the cargo pod is connected to an underside of the wing assembly.

12. The aircraft of claim 1, further comprising an external payload between the first and second fuselages, wherein the external payload is modular.

13. The aircraft of claim 12, wherein the external payload is connected to an underside of the wing assembly.

14. The aircraft of claim 12, wherein the external payload comprises at least one of a weapons assembly and a sensor.

15. An electric vertical takeoff and landing aircraft (eVTOL) selectively convertible between a hover mode and a cruise mode, the eVTOL comprising:
a first fuselage;
a second fuselage parallel to the first fuselage;
a wing assembly connecting the first and second fuselages;
first and second forward propulsion systems attached to forward ends of the first and second fuselages, the first and second forward propulsion systems comprising first and second pylons tiltable relative to the first and second fuselages between a first position when the aircraft is in a hover mode, in which rotor blades of the first and second forward propulsion systems are disposed above the first and second fuselages, and a second position when the aircraft is in a cruise mode, in which the rotor blades of the first and second forward propulsion systems are disposed forward of forward ends of the first and second fuselages, wherein each of the pylons houses a drive system for providing rotational power to rotor assemblies of the forward propulsion systems; and first and second aft propulsion systems fixedly attached to the first and second fuselages proximate aft ends thereof such that rotor blades of the first and second aft propulsion systems are rotatable in a plane substantially parallel with longitudinal axes of the first and second fuselages, wherein the first and second aft propulsion systems comprise pylons attached directly to upper surfaces of the first and second fuselages.

16. The eVTOL of claim 15, further comprising first and second wing-mounted propulsion systems tiltably connected to outboard ends of the wing assembly.

17. The eVTOL of claim 16, further comprising first and second wing tips fixedly connected to outboard sides of the first and second wing-mounted propulsion systems.

18. The eVTOL of claim 17, wherein the first and second wing-mounted propulsion systems and the first and second wing tips are collectively tiltable between a first position when the aircraft is in a hover mode and a second position when the aircraft is in a cruise mode.

19. The eVTOL of claim 15, wherein each of the propulsion systems includes a rotor assembly comprising a plurality of rotor blades.

20. The eVTOL of claim 19, wherein the rotor assemblies of the first and second aft propulsion systems rotate when the aircraft is in the hover mode and cease to rotate when the aircraft is in the cruise mode.

* * * * *

UNITED STATES PATENT AND TRADEMARK OFFICE
CERTIFICATE OF CORRECTION

| | |
|---|---|
| PATENT NO. | : 11,691,725 B2 |
| APPLICATION NO. | : 17/528989 |
| DATED | : July 4, 2023 |
| INVENTOR(S) | : Steven R. Ivans et al. |

It is certified that error appears in the above-identified patent and that said Letters Patent is hereby corrected as shown below:

In the Claims

In Column 11, Claim 1, Line 60, change "first and second propulsion" to -- first and second forward propulsion --.

In Column 12, Claim 9, Line 37, delete "1" and insert -- 3 --, therefor.

Signed and Sealed this
Twenty-ninth Day of August, 2023

Katherine Kelly Vidal
*Director of the United States Patent and Trademark Office*